United States Patent [19]

Otteman

[11] Patent Number: 4,744,387
[45] Date of Patent: May 17, 1988

[54] FLUID PRESSURE REGULATOR

[76] Inventor: John H. Otteman, 4005 Hecker Pass Hwy., Gilroy, Calif. 95020

[21] Appl. No.: 66,898

[22] Filed: Jun. 25, 1987

[51] Int. Cl.$^4$ .............................................. F16K 31/12
[52] U.S. Cl. ............................... 137/505.41; 137/505; 137/505.42
[58] Field of Search ............... 137/505, 505.41, 505.42

[56] References Cited

U.S. PATENT DOCUMENTS

| | | | |
|---|---|---|---|
| 774,340 | 11/1904 | Smith | 137/505.41 |
| 2,342,659 | 2/1944 | Grove | 137/505.42 X |
| 2,380,459 | 7/1945 | Niesemann | 137/505.42 X |
| 3,279,495 | 10/1966 | Taylor | 137/505.41 X |
| 3,747,625 | 7/1973 | Bauman | 137/505.41 X |

Primary Examiner—Harold W. Weakley
Attorney, Agent, or Firm—Donald D. Mon

[57] ABSTRACT

A fluid pressure regulator having a flow path from inlet port to outlet port. Reduction of particulates which might be generated by the regulator itself are minimized by the absence of springs, freely moving parts, and rubbing contacts in the flow path, and by minimizing the cavity volume.

4 Claims, 1 Drawing Sheet

4,744,387

FLUID PRESSURE REGULATOR

FIELD OF THE INVENTION

This invention relates to fluid pressure regulators for maintaining a selected downstream fluid pressure.

BACKGROUND OF THE INVENTION

Regulator valves have a self-adjusting orifice which varies to increase or to decrease the fluid flow in order to maintain the selected pressure. Conventionally these regulators utilize a spring opposed to a diaphragm exposed to the fluid whose pressure is being regulated. Conventional regulators are in widespread use, and for many applications where the requirements are not especially stringent, they function satisfactorily. The term "fluid" is used herein as generic to liquids and gases.

However, there are applications where the construction of conventional regulators raises problems which either are ignored to disadvantage, or are rectified by additional equipment or processes.

For example, many processes require fluid to be supplied with utmost purity. An example is in the semi-conductor industry, wherein stray particulates which might be introduced into the fluid stream from the regulator itself can scrap very expensive products when they land on a product in a location where the particulates would destroy the product's intended function. An example is a conductive particle that bridges two electronic components on a chip.

Sources of such particulates in a regulator are diaphragms, valves, and especially springs in the fluid path. The flexure of the springs, and the rubbing or abutment of the parts, including the rubbing of the spring on the parts between which it is opposed, are examples.

Another objection to conventional regulator construction is the requisite size of its inlet cavity caused by the need to house certain parts in it. Larger volumes are more difficult to purge, take a longer time to purge, and are wastefully expensive in costly reactants which must be disposed of when the system is purged.

While this regulator is expected to make its first and possibly most important impact in the semi-conductor reactor field, it also will provide important advantages in such fields as calibration systems, analysis systems, and systems for carrier fluid in fluid chromatography.

In addition, this regulator is useful whenever regulators are needed, not merely in high purity fluid systems. Its inherent simplicity and convenience in assembly, adjustment and use, commend it for general usage.

It is an object of this invention to remove all springs from the flow path, to eliminate all freely moving parts and rubbing contacts in the flow path, and to minimize the cavity volume.

BRIEF DESCRIPTION OF THE INVENTION

A regulator according to this invention has a body with an inlet port and an outlet port. The inlet port enters an inlet cavity, and the outlet port discharges from a sensing cavity. A poppet passage interconnects the cavities, and at its end in the inlet cavity it is surrounded by a valve seat.

A poppet has a stem which passes through the poppet passage with clearance for the flow of fluid. A poppet head is mounted to the poppet stem in the inlet cavity, with a peripheral seal adapted to abut against the seat to close the passage, or to move away from the seat to open it. The sensing cavity is partially bounded by a flexible diaphragm to which the poppet spring is fixed for axial motion in response to flexure of the diaphragm.

An adjusting screw is threadedly mounted to the body for coaxial movement with the poppet, on the other side of the diaphragm from the inlet cavity. It presses a compressible coil range spring between itself and the diaphragm, differential forces across the diaphragm which result in extension of the range spring tending to open the poppet valve, flexing the diaphragm toward the poppet passage in so doing.

An internally threaded coaxial passage in the adjusting screw receives a poppet spring adjusting screw having a spring anchor. A tension spring ("poppet spring") is connected to the anchor and to an anchor on the diaphragm. Increasing the tension of the poppet spring by appropriately turning the poppet spring adjusting screw tends to pull the poppet head toward the seat to close the valve.

Both springs are on the opposite side of the diaphragm from the inlet cavity, and are totally outside of the cavity.

According to preferred but optional features of the invention, the poppet spring adjusting screw is connected to the poppet spring by a swivel, and a thrust bearing is interposed between the adjusting screw and the range spring to reduce torsion on the spring during adjustment.

The above and other features of the invention will be fully understood from the following detailed description and the accompanying drawings, in which:

BRIEF DESCRIPTION OF THE INVENTION

FIG. 1 is an axial cross-section showing the preferred embodiment of the invention.

DETAILED DESCRIPTION OF THE INVENTION

Figure 1:
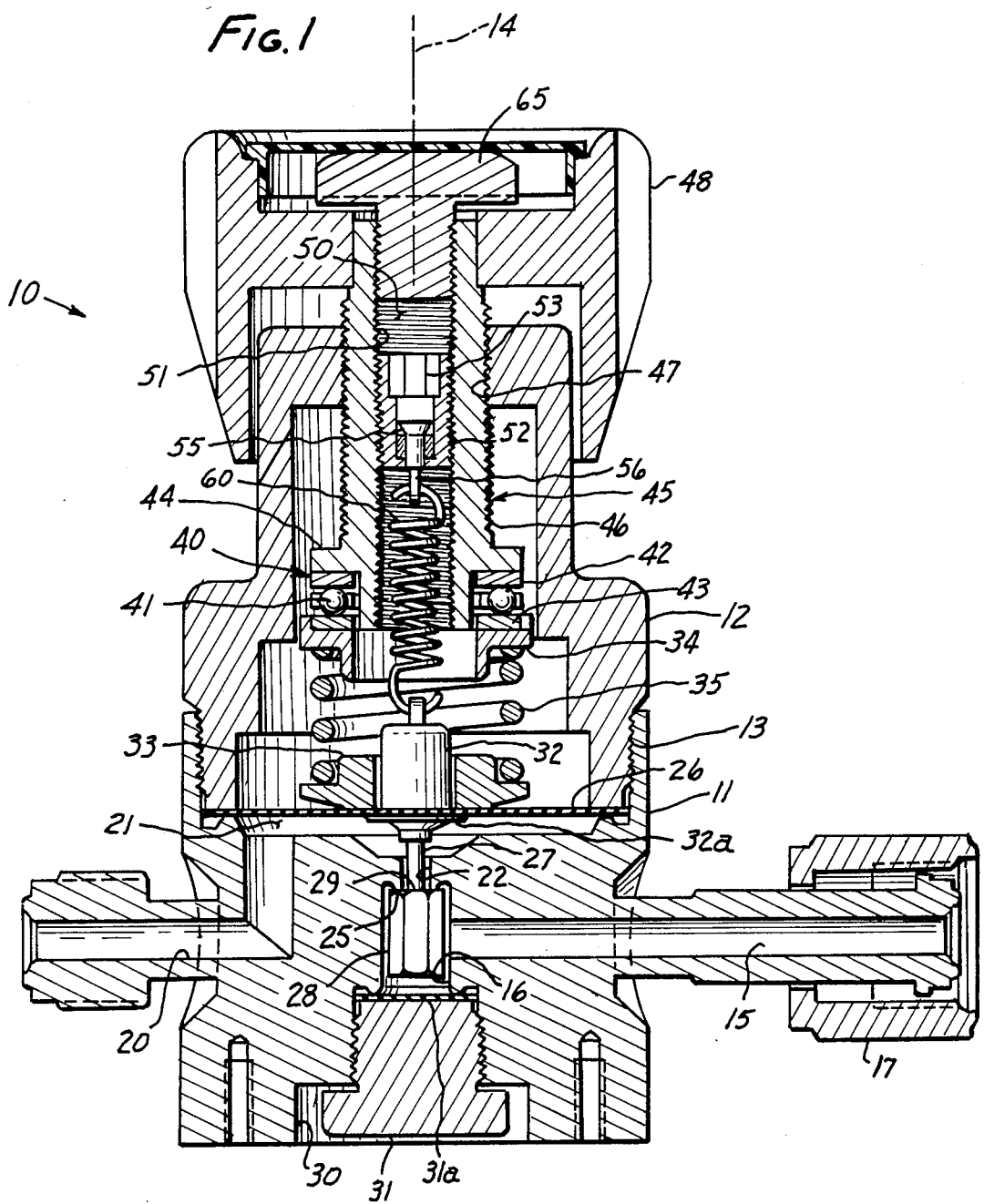

A regulator 10 according to the invention includes a body which is formed in two parts 11, 12 that are threadedly joined at threads 13. The valve has an actuation axis 14.

An inlet port 15 extends into the body and enters an inlet cavity 16. A conventional connector 17 is provided to plumb the regulator into the system.

An outlet port 20 extends into the body and enters a sensing cavity 21. A poppet passage 22 on axis 14 interconnects the inlet cavity and the outlet cavity. A raised ring-shaped valve seat 25 surrounds the poppet passage where it enters the inlet cavity.

The sensing cavity is partially bounded by the body, and partially by a flexible diaphragm 26. The diaphragm is circular (as are the cavities and the poppet passage), and its central portion moves axially when the differential forces across it change.

Poppet stem 27 passes through the poppet port, with a peripheral clearance so there is no rubbing action. A poppet head 28 is attached to the stem, or formed as part of it. A seal 29 on the poppet head faces toward the seat so as to close the poppet passage to flow when brought against the seat.

Access to the inlet chamber is provided through an access port 30. A plug 31 bears against a disc seal 31a to close the access port. When the plug is removed, the poppet head can be unthreaded from the stem, or if integral with the stem, the stem can be unthreaded from an anchor 32. This facilitates the assembly of the regulator.

Anchor 32 has a flange 32a that is attached and sealed to the diaphragm. A bottom spring guide 33 bears against the diaphragm and passes anchor 32. An upper spring guide 34 faces toward the bottom spring guide, and range spring 35 is placed between and in compressive opposition between them. A coil spring is the preferred device. However, any proportionally responsive device may be used instead, for example, a gas-loaded pressure dome. The term "rate spring" is intended to encompass all such equivalents.

A thrust bearing 40 having bearing balls 41 between races 42 and 43 is opposed between upper spring guide 34 and a flange 44 on a range adjusting screw 45. Screw 45 has an external thread 46 threaded into an opening 47 in the body. It is coaxial with axis 14. A knob 48 is fixed to screw 45 to turn it.

Range adjusting screw 45 has a central passage 50 with an internal thread 51. A poppet spring adjusting screw 52 is threaded into thread 51. It is provided with wrench-engaging surfaces 53 so it can be rotated to move it axially in the range adjusting screw. A swivel 55 is seated in screw 52 so as to rotate freely therein, but to move axially with it. It has an anchor 56 at its lower end.

Poppet spring 60 is a tension type coil spring held at its ends in tension between anchors 32 and 56. Its tendency is to draw the diaphragm upwardly. The tendency of the range spring is to press it downwardly. The compressive force exerted by the range spring is adjusted by turning the range spring adjusting screw. The tension on the poppet spring is adjusted by turning the poppet spring adjusting screw.

A cap screw 65 is threaded into the range spring adjusting screw to close its passage. It is removable to give access to the poppet spring adjusting screw. The compressive force on the range spring (and thereby the regulated pressure) is adjusted by turning the knob to turn the range spring adjusting screw.

It will be observed that there are no freely movable parts, or springs, or rubbing parts, in the fluid stream. The only physical contact is between the poppet and the seat.

The diaphragm flexes at most only about 0.030 inches at its center in the operation of a diaphragm having a free diameter of about 2 inches. Such minor flexure of a diaphragm, especially of a stainless steel diaphragm is unlikely to generate particulates. Especial attention is called to the relatively reduced dimensions of the inlet cavity and of the sensing cavity.

The poppet spring is provided for a relatively limited use, primarily as a check valve at low pressures and at low pressure settings. When the regulator is first assembled, with the range adjustment screw backed off to relieve most of the compressive force on the range spring, the tension on the poppet spring is set so it pulls the poppet closed at low downstream pressures, perhaps 2 psi. Then cap screw 65 is set, and further adjustment of the poppet spring will rarely be required.

Adjustment of the regulated pressure is accomplished by turning the range spring adjusting screw to adjust the spring force it exerts on the diaphragm. Fluid pressures in the sensing cavity which produce a force greater than the adjusted spring force move the center of the diaphragm and the poppet upwardly in FIG. 1 to reduce the orifice at the poppet seat or to close it. Lesser pressures tend to open the regulator. Thus, the range spring setting establishes the regulated output pressure.

The illustrated regulator provides the disclosed advantages in a readily constructed device. The materials of construction will usually be stainless steel, although they may instead by any other material with suitable mechanical properties and resistance to the fluids being regulated.

This invention is not to be limited by the embodiment shown in the drawings and described in the description, which is given by way of example and not of limitation, but only in accordance with the scope of the appended claims.

I claim:

1. A fluid pressure regulator having an axis and comprising:

a body having an inlet cavity and a sensing cavity, an inlet port to the inlet cavity and an outlet port to the sensing cavity;

an axial poppet passage interconnecting said cavities;

a poppet seat surrounding said poppet passage in said inlet cavity;

an axial poppet stem passing through said poppet passage with a peripheral clearance;

a poppet head on said stem in said inlet cavity;

a poppet seat on said poppet head facing said seat and adapted to bear against it to close said poppet passage or to move away from it to open said poppet passage;

a flexible diaphragm partially closing said sensing chamber, extending generally normal to said axis, said poppet stem being attached thereto on said axis for axial movement when said diaphragm is flexed;

a range spring;

an axial range spring adjusting screw threadedly mounted in said body for movement toward and away from said diaphragm when said range spring adjusting screw is turned, said range spring being compressed between said diaphragm and said range spring adjusting screw, said range spring adjusting screw having a central passage with an internal thread;

a poppet spring; and a poppet spring adjusting screw threaded into said central passage, said poppet spring being anchored in tension between said poppet spring adjusting screw and said diaphragm.

2. A fluid pressure regulator according to claim 1 in which a swivel is retained by said poppet spring adjusting screw which is freely rotatable relative to it, and which swivel constitutes an anchor for one end of said poppet spring.

3. A fluid pressure regulator according to claim 1 in which said range spring adjusting screw includes a peripheral shoulder, and in which a thrust bearing is disposed in compression between said shoulder and said range spring.

4. A fluid pressure regulator according to claim 3 in which a swivel is retained by said poppet spring adjusting screw which is freely rotatable relative to it, and which swivel constitutes an anchor for one end of said poppet spring.

* * * * *